Oct. 23, 1962          C. SABBIONI                3,059,545
      HYDRAULIC DEVICES FOR AUTOMATIC CONTROL OF MECHANICAL
         MOVEMENT, E.G., OF ADVANCE OF A GEAR BLANK IN
                    A GEAR CUTTING MACHINE
                     Filed Dec. 8, 1959
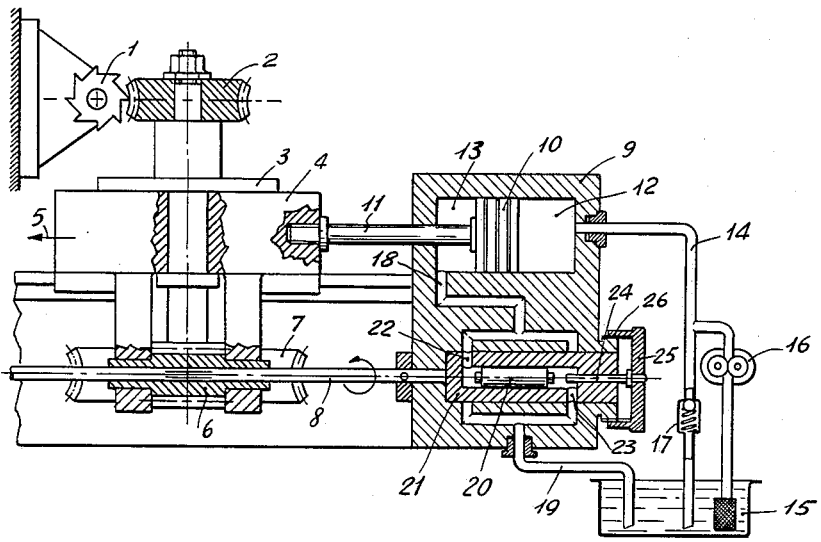
                                        INVENTOR
                              CESARE Sabbioni
                          BY Bailey, Stephens & Huettig
                                        ATTORNEYS

United States Patent Office 3,059,545
Patented Oct. 23, 1962

3,059,545
HYDRAULIC DEVICES FOR AUTOMATIC CONTROL OF MECHANICAL MOVEMENT, E.G., OF ADVANCE OF A GEAR BLANK IN A GEAR CUTTING MACHINE
Cesare Sabbioni, Bologna, Italy. (% Ufficio Brevetti Racheli e Bossi & c., Via Pietro Verri 6, Milan, Italy)
Filed Dec. 8, 1959, Ser. No. 858,218
Claims priority, application Italy Apr. 13, 1959
4 Claims. (Cl. 90—4)

This invention relates to hydraulic devices for automatic control of mechanical movement, e.g. of advance of a gear blank in a gear-cutting machine.

The invention consists in a device for automatically controlling operation of a hydraulic ram or the like, which includes a main cylinder and plunger, ram or piston therein actuated by liquid under pressure, the device being adapted to control the displacement of a first mechanical member as a function of the rotational velocity of a second member, by regulating the volume of liquid discharged from or admitted to the main cylinder. The device may for example be advantageously employed for automatically regulating the feed of a gear to be cut in relation to a stationary cutting tool or hob, and vice versa, in a gear cutting machine, but it is not limited to gear-cutting machines and may be applied to other machine tools intended for other purposes, and to mechanical structures of any kind.

When the invention is applied to a gear cutting machine, it may automatically control or regulate (even when the machine is running), the reciprocal shifting movement between a sliding plate being the first mechanical member carrying the gear to be cut, and the cutting hob, the movement being a function of the number of revolutions of a support e.g. a plate carrying the gear (being the second mechanical member). The distributing appliance may, for instance, comprise a small auxiliary plunger, with adjustable stroke, sliding inside an auxiliary rotatable cylinder, and carrying at each end an inlet opening, which openings in turn communicate with an outlet for liquid coming from the main cylinder and flowing through a system of outlet passages the whole being arranged so that for every half turning of the auxiliary cylinder, the input and the discharge of liquid to or from the auxiliary cylinder is reversed: i.e. the channel which initially conveyed liquid to the left chamber of the auxiliary cylinder thereafter acts as feeder of liquid to the right hand chamber, during which time the discharge outlet of right hand side chamber communicates with the left hand side chamber. Adjustment of the stroke of the auxiliary plunger may be effected by a rod which extends axially into the auxiliary cylinder so as to limit the stroke to a greater or less extent. The axial shifting of the rod may be carried out, even during operation, by means of a graduated drum which is turned screw-wise micrometrically.

The accompanying drawing shows diagrammatically, and by way of example, a control device according to the invention when applied to a gear cutting machine, wherein the hob is radially cutting the gear.

Referring to the drawing herewith various members are shown somewhat diagrammatically for easier understanding.

A cutting hob 1 is mounted on the cutting machine and rotates at a prearranged speed but it does not shift linearly. The gear 2 to be cut is fixed on a revolving support 3 carried on a saddle 4 which is slidable longitudinally in the direction of the arrow 5 for the necessary feeding shifts of the gear as the cutting of the teeth becomes deeper and deeper. The rotation of the gear support 3 is effected by means of a worm-gear 6 with an associated gear 7, the worm gear 6 being slidable along its shaft 8 to which it is attached by a sliding key.

The axial gear shifts in the direction of the arrow 5 are effected by a hydraulic reversible ram arrangement, which includes a main cylinder 9, and a main ram or plunger 10 fixed to a rod 11. During the cutting operation, a chamber 12 on one side of the plunger 10 in the main cylinder, is fed with oil or other liquid through an inlet pipe 14, the liquid being drawn from a tank 15 and impelled by gear pump 16, the pipe 14 being provided with a pressure regulating valve 17. A duct 18 is adapted to conduct oil discharged from the chamber 13 on the other side of the plunger 10, and a discharging outlet communicates with the tank 15 by means of a pipe 19 while a control and regulation distributor is located between duct 18 and pipe 19. This distributing device constitutes an important component, of the invention.

The distributing unit has the function of controlling and regulating the volume of liquid discharged from chamber 13 of the main cylinder (and thus the liquid which enters into the chamber 12 of the same cylinder), and comprises an auxiliary plunger 20 of adjustable stroke, axially slidable inside an auxiliary cylinder 21 which revolves about its axis, on account of its being connected to the rotating rod 8 transmitting rotation to the worm gear 6. The auxiliary cylinder 21 is provided at one end and on one side with a radial inlet opening 22 for the admission of liquid flowing from duct 18, whilst at the opposite end and on the other side it is provided with a radial opening 23 for escape of liquid to the pipe 19 which discharges it into the tank 15. When the auxiliary cylinder 21 turns through 180° the position of the two openings is reversed, namely the opening 22 communicates with ducts leading to the pipe 19, and the opening 23 communicates with the inlet pipe 18. With this arrangement, the plunger 20 previously shifted from left to right under the pressure exerted on it by the entering liquid, is thereafter shifted from right to left and so on repeatedly. Thus after each full revolution of the rod 8 a volume of liquid is discharged from the chamber 13, in a quantity twice the capacity of the cylinder 21, by the plunger 20 during one complete reciprocal stroke. The stroke of the plunger 20 is adjustable (even during operation), by means of a rod 24 fixed to a graduated drum 25 which is screwable, with a micrometric screw, on a threaded projection 26. By reducing the stroke of the auxiliary plunger 20, the volume of the liquid which is admitted to the chamber and passes to discharge, is diminished, so that the plunger 10 of the main ram 10 moves more slowly in the main cylinder 9 and there is thus a smaller shift, for each revolution of the gear support 3, of the saddle 4 in the direction of the arrow 5. The rate of feeding, i.e. the rate of depth of the metal to be removed by the hob at each revolution of the gear to be cut, is thus reduced. In place of a single auxiliary plunger 20 there may be provided more such plungers, conveniently timed to obtain a more uniform output of the discharged liquid.

The graduation of the drum 25 preferably corresponds to the rate of feeding for each revolution of the gear 2.

The advantages of the device according to the invention, compared with hydraulic devices of the conventional kind, are various and important.

With conventional hydraulic devices, the speed of the main ram with respect to that of the cylinder is regulated by restriction at the outlet or inlet of the fluid, so that it may happen that a change in the temperature may reduce the viscosity of the fluid, the flow of the fluid being then easier, resulting in a greater velocity in the shifting of the ram. It may also happen that due to variation of the nature of the material and of the dimensions of the cutting in the gear, the resistance to the shifting of the ram may also vary, with resulting change of input in said restriction and consequent variation of velocity of movement of the ram. With the device according to the invention the above inconveniences are eliminated, because the volumetric control of the liquid admitted to or discharged from the cylinder 9 is practically independent of the viscosity of the liquid and of resistance to the shifting movement of the ram. Moreover, by varying the rotational speed of the gear support the velocity of feed is automatically adjusted to suit the new conditions, whereas in known hydraulic devices separate adjustment was necessary.

An increase in the rotational velocity of the support 3 which carries the gear to be cut causes a proportional increase of the speed of the rod 8, consequently increasing the speed of the auxiliary cylinder 21 and, therefore, also the to-and-from motion of the plunger 20 thereby influencing the quantity of the liquid discharged and, finally, the rate of movement of the main ram 10.

When the number of teeth to be cut in the gear is varied no adjustment is required in the device controlling the advancement, because the adjustment is carried out automatically in accordance with the new requirements. Even when other reasons, not depending on the number of teeth of the gear, but, for instance, on the hardness of the material or the like, would suggest adjustment of working speed, such adjustment is carried out automatically by the device according to the invention. Another advantage of the device according to the invention is the possibility to regulate the position of the graduated drum 25 during operation so that it is not necessary to stop the machine for the purpose of varying the speed of feeding. Temperature variations, with consequential variability in the flow of the oil, do not effect the rate of feeding, as the regulating controls the volumetric quantity of the liquid discharged from the chamber 13 of the cylinder 9, and not a dynamic variation due to the restriction of a passage and to the flow velocity. The same control device can be applied to the two chambers, 12 and 13 of the main cylinder, and is applicable not only to gear cutting machines and machine tools in general, but also to any type of machine and its members. The distributing device 21 which is actuated by the oil flowing through the duct 18 may be replaced by any other equivalent device capable of controlling the volumetric quantity of oil discharged from the cylinder 9: it may, for instance, be replaced by a small pump.

What I claim is:

1. A hydraulic device for automatically controlling in a continuous working process the relative rates of movement of a first linearly displaceable member and of a second angularly displaceable member operatively related to each other, comprising hydraulic means operatively connected to the first member to produce linear movement thereof, said hydraulic means including volumetric control means for passing predetermined volumes of hydraulic fluid to produce proportional linear movements of the first member, and means operatively connecting said control means to said second member so as to pass predetermined volumes of hydraulic fluid in response to proportional movements of said second member, said hydraulic means comprising a main cylinder and a piston slidable therein one of which is connected to the first member, and said control means comprises a distributing assembly including means to regulate the hydraulic flow in said main cylinder, said distributing device comprising a revolving sleeve operatively connected to said second member for turning thereby proportionally to the turning of the second member, said sleeve having an opening thereinto adjacent each end, said device including means forming an outlet from the main cylinder and outlet ducts both connected to said outlet and leading to points on the outside of the sleeve adjacent said openings, the points of coincidence of the outlet ducts with the openings being displaced 180° from each other, and a plunger slidable in said sleeve between said openings, whereby during each 180° of the turning of the sleeve one of said openings communicates with one of said ducts so that outlet fluid is fed in a measured quantity into the chamber in the sleeve on the same side of the plunger while the second opening permits the escape of fluid from the chamber in the sleeve on the other side of the plunger.

2. A device as claimed in claim 1, means for adjusting the stroke of the auxiliary plunger, comprising a rod axially projecting into the sleeve to limit the stroke of said plunger.

3. A device as claimed in claim 2, the rod projecting into the auxiliary cylinder being adjustable by screw means associated with a drum provided with micrometric graduation.

4. A device as claimed in claim 1 in which said first member is a slide mounted for linear movement towards and from a gear cutting tool and said second member is a gear carrier turnably carried by the slide.

References Cited in the file of this patent

UNITED STATES PATENTS

| | | |
|---|---|---|
| 606,700 | Beastow | July 5, 1898 |
| 651,502 | Fitzgerald | June 12, 1900 |
| 1,969,063 | Ernst et al. | Aug. 7, 1934 |
| 2,017,999 | West | Oct. 22, 1935 |
| 2,361,460 | Daugherty | Oct. 31, 1944 |